US007849300B2

(12) United States Patent
Hsu et al.

(10) Patent No.: US 7,849,300 B2

(45) Date of Patent: Dec. 7, 2010

(54) METHOD FOR CHANGING BOOTING SOURCES OF A COMPUTER SYSTEM AND A RELATED BACKUP/RESTORE METHOD THEREOF

(75) Inventors: Wen-Shiu Hsu, Taipei (TW); Chiung-Wen Chang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 720 days.

(21) Appl. No.: 11/704,215

(22) Filed: Feb. 9, 2007

(65) Prior Publication Data

US 2007/0198822 A1 Aug. 23, 2007

(30) Foreign Application Priority Data

Feb. 23, 2006 (TW) .............................. 95106144 A

(51) Int. Cl.
*G06F 15/177* (2006.01)

(52) U.S. Cl. ................................ 713/1; 713/2; 713/100

(58) Field of Classification Search ...................... 713/1
See application file for complete search history.

(56) References Cited

U.S. PATENT DOCUMENTS

| | | | | |
|---|---|---|---|---|
| 5,274,816 | A * | 12/1993 | Oka | 713/2 |
| 5,469,573 | A * | 11/1995 | McGill et al. | 717/127 |
| 6,088,794 | A * | 7/2000 | Yoon et al. | 713/2 |
| 6,115,815 | A * | 9/2000 | Doragh et al. | 713/2 |
| 6,128,734 | A * | 10/2000 | Gross et al. | 713/100 |
| 6,175,904 | B1 * | 1/2001 | Gunderson | 711/162 |
| 6,292,890 | B1 * | 9/2001 | Crisan | 713/2 |
| 6,356,965 | B1 * | 3/2002 | Broyles et al. | 710/104 |
| 6,490,598 | B1 | 12/2002 | Taylor | |
| 6,654,826 | B1 * | 11/2003 | Cho et al. | 710/62 |
| 6,748,553 | B2 * | 6/2004 | McBride et al. | 714/15 |
| 6,804,775 | B1 * | 10/2004 | Park | 713/2 |
| 6,931,525 | B2 * | 8/2005 | Numata et al. | 713/100 |
| 7,055,026 | B2 * | 5/2006 | Gere | 713/100 |
| 7,073,013 | B2 * | 7/2006 | Lasser | 711/102 |
| 7,234,055 | B2 * | 6/2007 | Chiu et al. | 713/2 |
| 7,536,598 | B2 * | 5/2009 | Largman et al. | 714/36 |
| 2002/0157001 | A1 * | 10/2002 | Huang et al. | 713/2 |
| 2003/0046502 | A1 | 3/2003 | Okazaki | |
| 2004/0095382 | A1 * | 5/2004 | Fisher et al. | 345/744 |
| 2006/0095753 | A1 * | 5/2006 | Hori | 713/1 |
| 2007/0226436 | A1 * | 9/2007 | Cheng et al. | 711/162 |

FOREIGN PATENT DOCUMENTS

| | | |
|---|---|---|
| CN | 1530849 A | 9/2004 |
| TW | 200519729 | 6/2005 |
| TW | I248579 | 2/2006 |

OTHER PUBLICATIONS

Curtis, "Unix Backup & Recovery Passage", 1999, pp. 270-281.

* cited by examiner

*Primary Examiner*—Nitin C Patel
(74) *Attorney, Agent, or Firm*—Winston Hsu; Scott Margo

(57) ABSTRACT

A method for changing a booting source when a first operating system is being executed is disclosed. The method is utilized in a computer system having a first storage device storing the first operating system and a second storage device storing a second operating system. The method includes: receiving a signal from the second storage device; detecting whether the second storage device is a target device; setting the second storage device as a booting device; rebooting; and executing the second operating system from the second storage device.

8 Claims, 8 Drawing Sheets

41 Receive a signal from a second storage device

42 Detect whether the second storage device is a target device

43 Set the second storage device as a booting device

44 Reboot

45 Execute a second operating system

METHOD FOR CHANGING BOOTING SOURCES OF A COMPUTER SYSTEM AND A RELATED BACKUP/RESTORE METHOD THEREOF

BACKGROUND OF THE INVENTION

1. Field of the Invention

The present invention relates to a method for changing a booting source in a computer system, and more particularly, to a data backup/restore method utilizing the method for changing a booting source.

2. Description of the Prior Art

In computer systems, the concepts of data backup/restore are widely known. A user can backup important data or files in an external target device. If the files inside the computer system are damaged, the user can utilize the backup files inside the target device to restore the damaged files. For example, the user can directly copy a file into the target device, or execute a backup program to burn data/files into an image file and store the image file in the target device.

When utilizing a backup program, however, the user has to first set the BIOS of the computer system to change the booting source, then determine a source disk (which stores the files to be backed up) and a target disk (which the files are copied to), and finally reboot the computer system to execute an operating system stored in the target disk such that the backup/restore operation can be performed correctly.

As some users are not familiar with the settings of BIOS, it is difficult for them to set the BIOS themselves, resulting in some errors. Today's backup/restore programs do not enable the users to complete backup/restore operations easily.

SUMMARY OF THE INVENTION

It is therefore one of the primary objectives of the claimed invention to provide a method for automatically changing a booting source in a computer system and the related backup/restore method, to solve the above-mentioned problem.

According to an exemplary embodiment of the claimed invention, a method for changing a booting source when a first operating system is being executed is disclosed. The method is utilized in a computer system having a first storage device storing the first operating system and a second storage device storing a second operating system. The method comprises: receiving a signal from the second storage device; detecting whether the second storage device is a target device; setting the second storage device as a booting device; rebooting; and executing the second operating system from the second storage device.

According to another exemplary embodiment of the claimed invention, a method for backuping/restoring data when a first operating system is being executed is disclosed. The method is utilized in a computer system having a first storage device storing the first operating system and a second storage device storing a second operating system. The method comprises: receiving a signal from the second storage device; detecting whether the second storage device is a target device; setting the second storage device as a booting device; rebooting; executing the second operating system from the second storage device; and executing a data backup/restore program.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
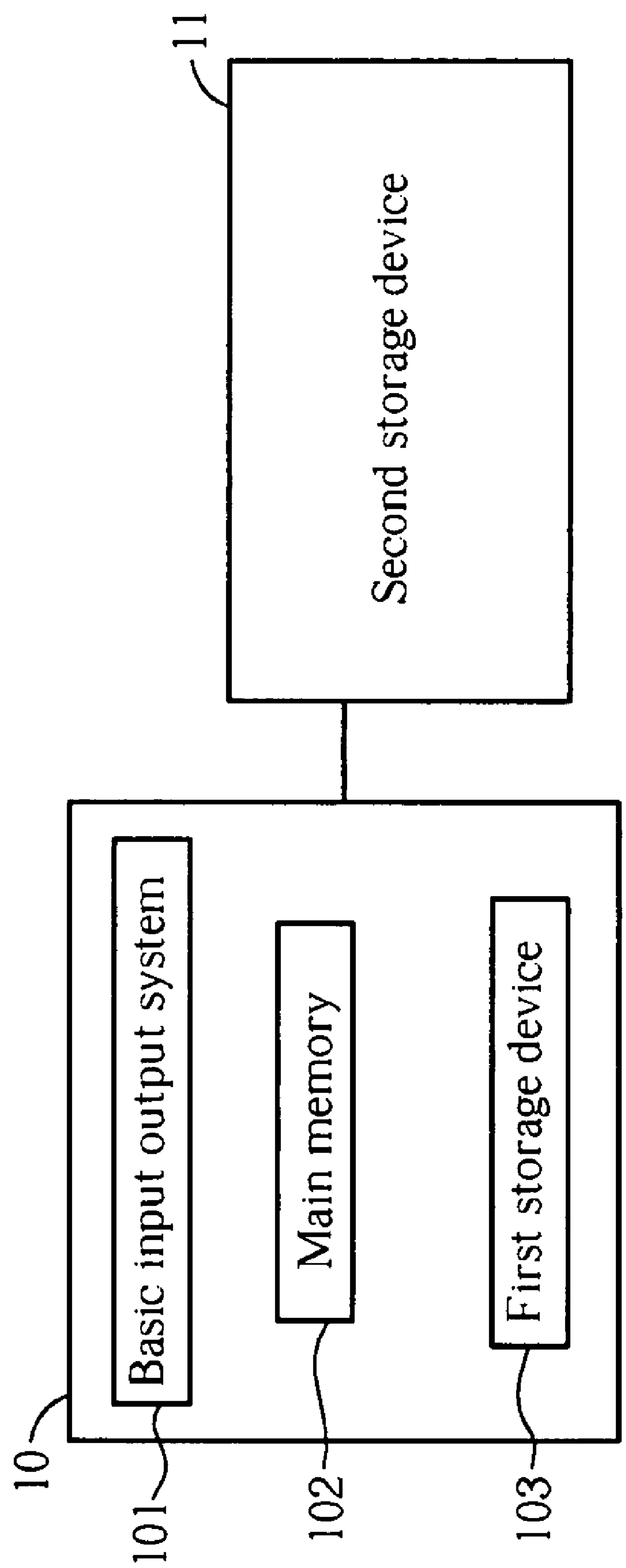
FIG. 1 is a hardware block diagram of a first embodiment according to the present invention.

Please refer to FIG. 1, which is a hardware block diagram of a first embodiment according to the present invention. In some embodiments, the computer system 10 can be a desktop computer or a laptop. The computer system 10 can comprise a basic input output system (BIOS) 101 for initializing the computer system 10. The main memory 102 is used to store programs or can be used as a buffer for storing data when the programs are being executed. In an embodiment, the main memory 102 can be a random access memory (RAM). The computer system 10 further comprises a first storage device 103 for storing data and programs. Please note that the computer system 10 can be connected to a second storage device 11. In this embodiment, the second storage device 11 is an external storage device, which is plugged into the computer system 10. For example, the second storage device 11 can be a USB storage device such as flash memory sticks, an MP3 player, or memory cards. Please note that this modification is only regarded as an example, and not a limitation of the present invention. For example, the second storage device 11 can be a storage device utilizing an IEEE 1394 interface.

Figure 2:
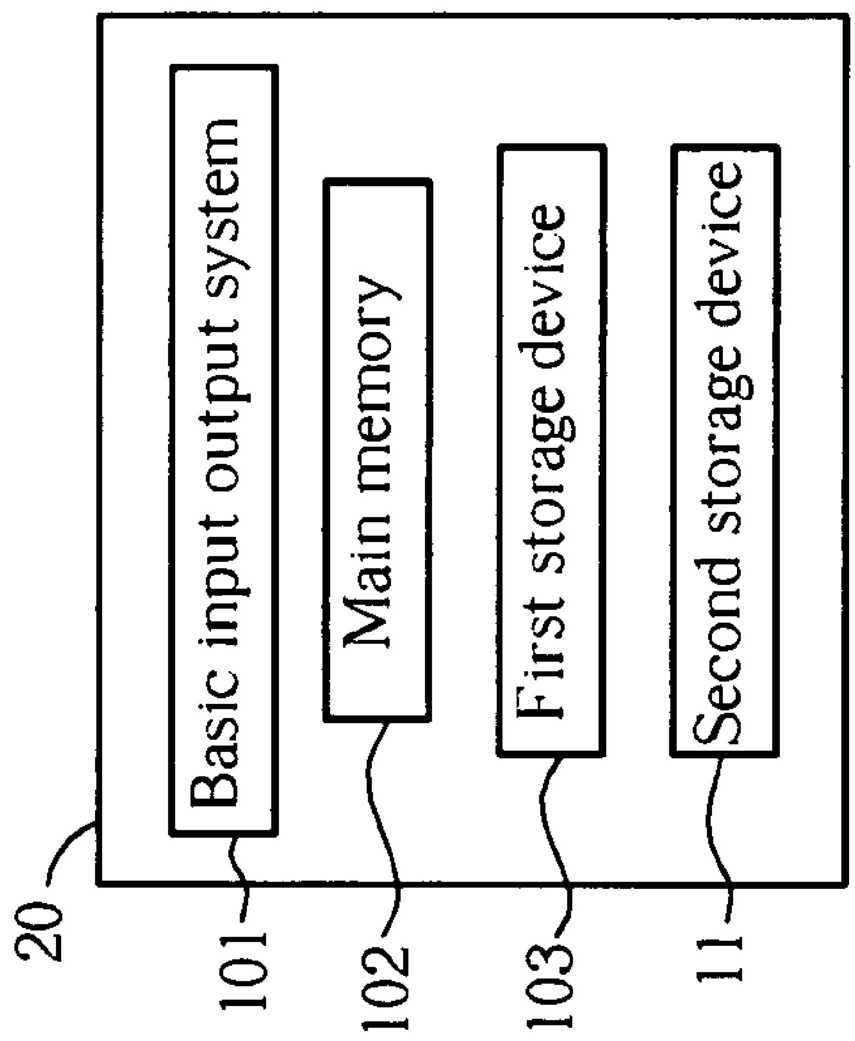
FIG. 2 is a hardware block diagram of a second embodiment according to the present invention.

Please refer to FIG. 2, which is a hardware block diagram of a second embodiment according to the present invention. The difference between the first and the second embodiments is that the second storage device 11 of the second embodiment is an inner device of the computer system 20. The hardware block diagram shown in FIG. 2 illustrates that the present invention hardware structure is not limited as the hardware structure shown in FIG. 1. Furthermore, as long as the BIOS 101 supports the connection of a specific interface, the second storage device 11 can be implemented through all kinds of interfaces. Therefore, the present invention hardware structure is not limited to the hardware structures shown in FIG. 1 and FIG. 2. Furthermore, in order to illustrate the technique of the present invention, the hardware structure shown in FIG. 1 is utilized in the following disclosure.

Figure 3:
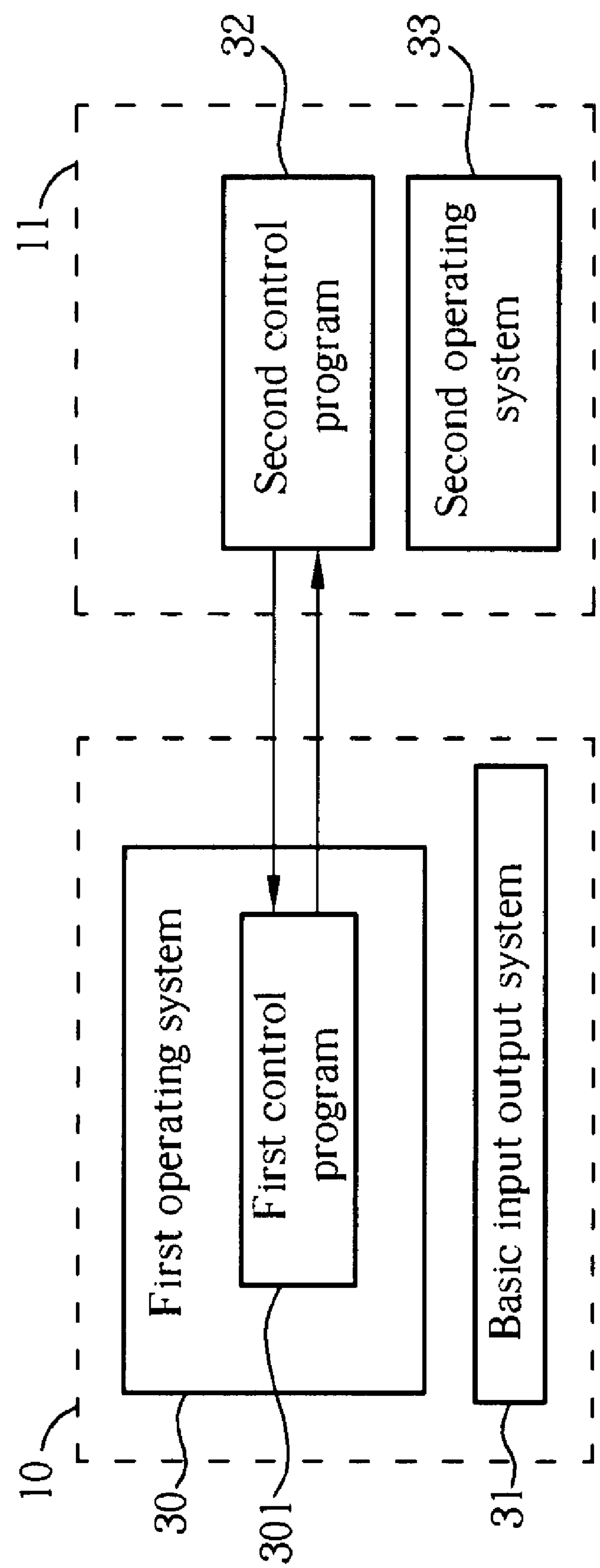
FIG. 3 is a software block diagram according to the present invention.

Please refer to FIG. 3, which is a software block diagram according to the present invention. As shown in FIG. 3, the computer system 10 comprises a first operating system 30 for providing a user interface such that the user can utilize the computer system 10 easily. In an embodiment, the first operating system 30 can be a well-known operating system "Windows" produced by the Microsoft Company.

In addition, the first operating system 30 comprises a first control program 301 for performing the steps of the present invention. These steps will be illustrated in the following disclosure. The computer system 10 further comprises a BIOS 31 for checking the memory space, checking ports existence, and controlling the order of the booting sources.

The second storage device 11 comprises a second control program 32. The second control program 32 is utilized to inform the computer 10 which port the second storage device 11 utilizes. Moreover, the second storage device 11 further comprises a second operating system 33 for providing a user interface. For example, the second operating system 33 can be the operating system DOS produced by the Microsoft Company.

Please note that the DOS and the Windows operating systems are only regarded as embodiments, and not limitations of the present invention. For example, the first and the second operating systems can be the same operating system. In the following disclosure, the steps of switching two operating systems are illustrated.

Figure 4:
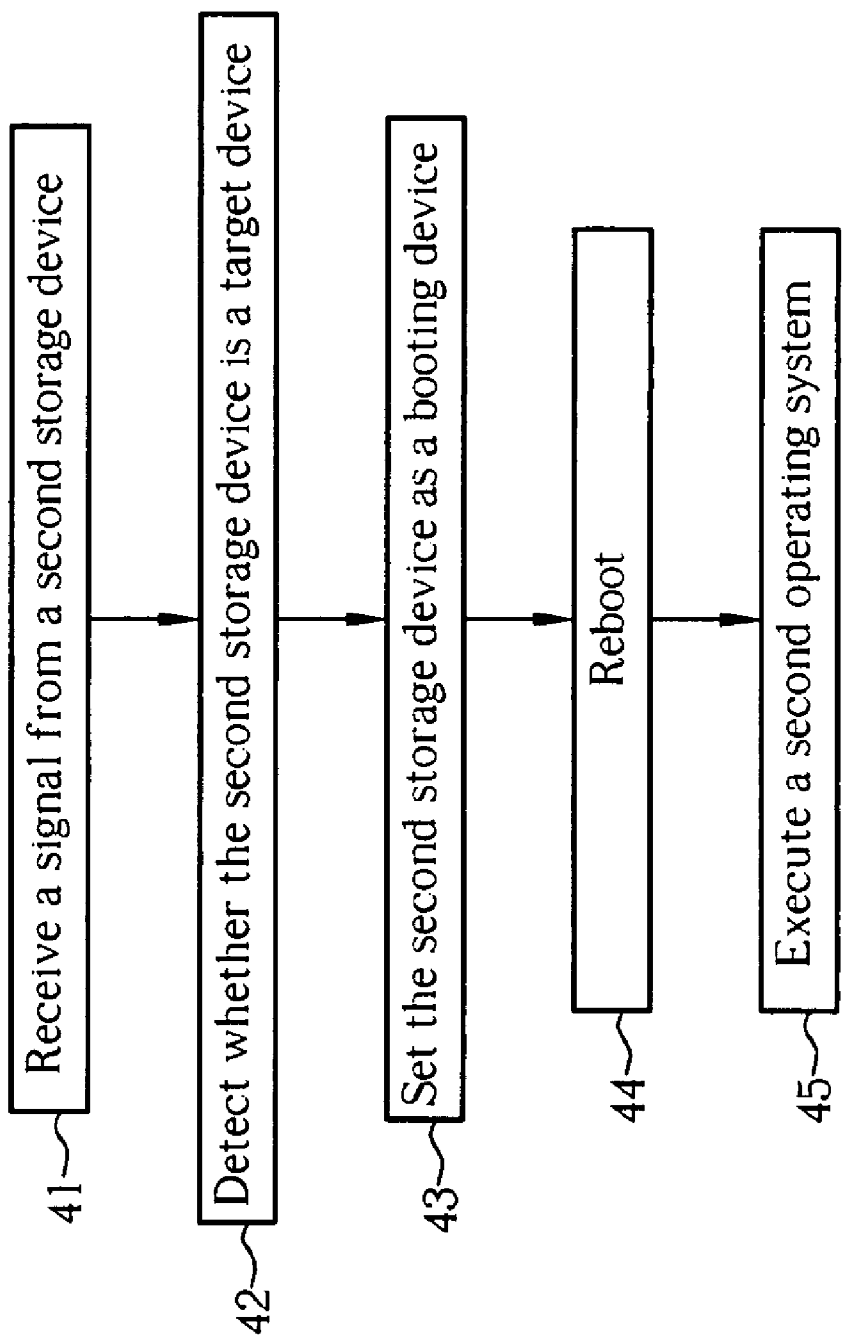
FIG. 4 is a flow chart of the first control program according to the present invention.

Please refer to FIG. 4, which is a flow chart of the first control program 301 according to the present invention. Please refer to FIG. 4 in conjunction with FIG. 3. When the second storage device 11 is connected to the computer system 10, the first control program 301 receives a signal from the second storage device 11 (step 41). In this embodiment, after the first control program 301 receives a signal from the second storage device 11, the first control program 301 obtains the information of the port, which is the second storage device 11 connected to. For example, the port information can be a port number or a bus controller. The first control program 301 then detects whether the second storage device 11 is a target device (step 42). In an embodiment, the target device can be a device for backing up/restoring data of the computer system 10. Please note that the target device is not limited to be a backuping/restoring device. Instead, the target device just needs to be a device storing an operating system such that the computer system 10 can utilize the device as a booting device. Furthermore, if the second storage device 11 is a target device, the control program 301 sets the second storage device 11 as the booting device of the computer system 10. In an embodiment, the first control program 301 can utilize a driver or an advanced configuration and power interface (ACPI) to change the booting order stored inside the BIOS 31, and then the computer system 10 is rebooted (step 44). Therefore, the computer system 10 executes the second operating system 33 from the second storage device 11 (step 45).

Figure 5:
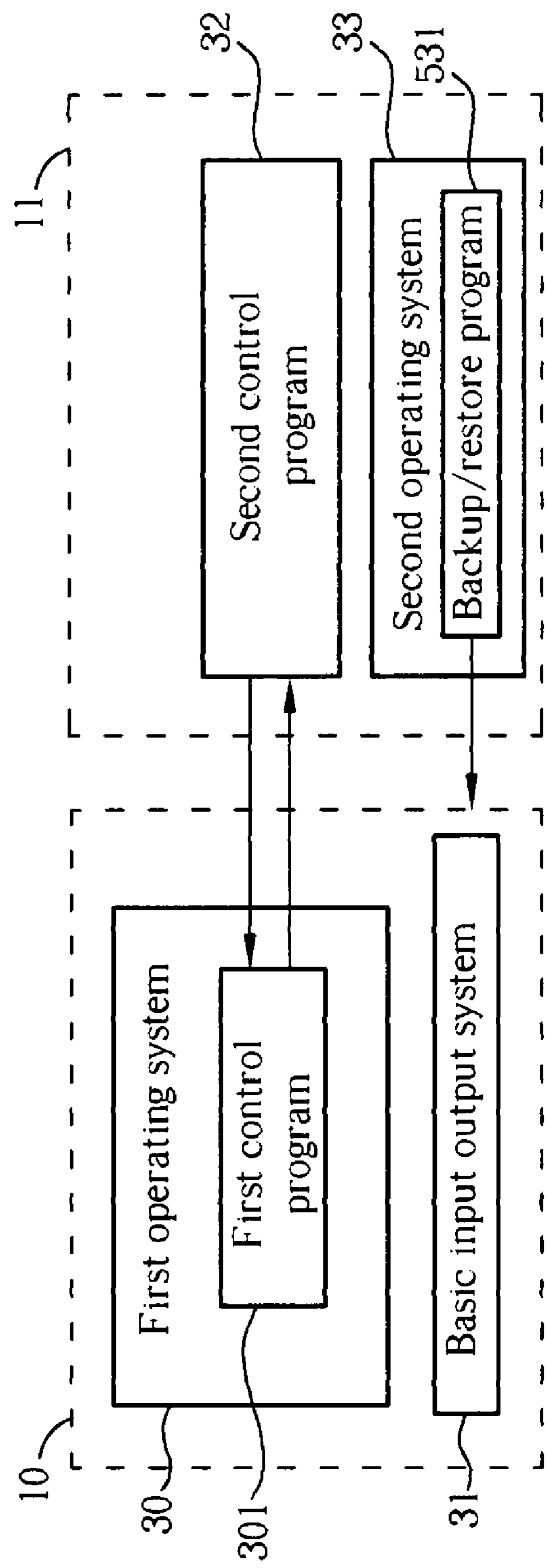
FIG. 5 is a software block diagram of another embodiment according to the present invention.

Please refer to FIG. 5, which is a software block diagram of another embodiment according to the present invention. In contrast to FIG. 3, the second operating system 33 further comprises another backup/restore program 531. The backup/restore program 531 is a program that can be executed under the second operating system 33, to backup/restore the computer system 10. In an embodiment, the backup/restore program 531 can be a well-known Ghost backup/restore program, which is produced by the Norton Company.

Figure 6:
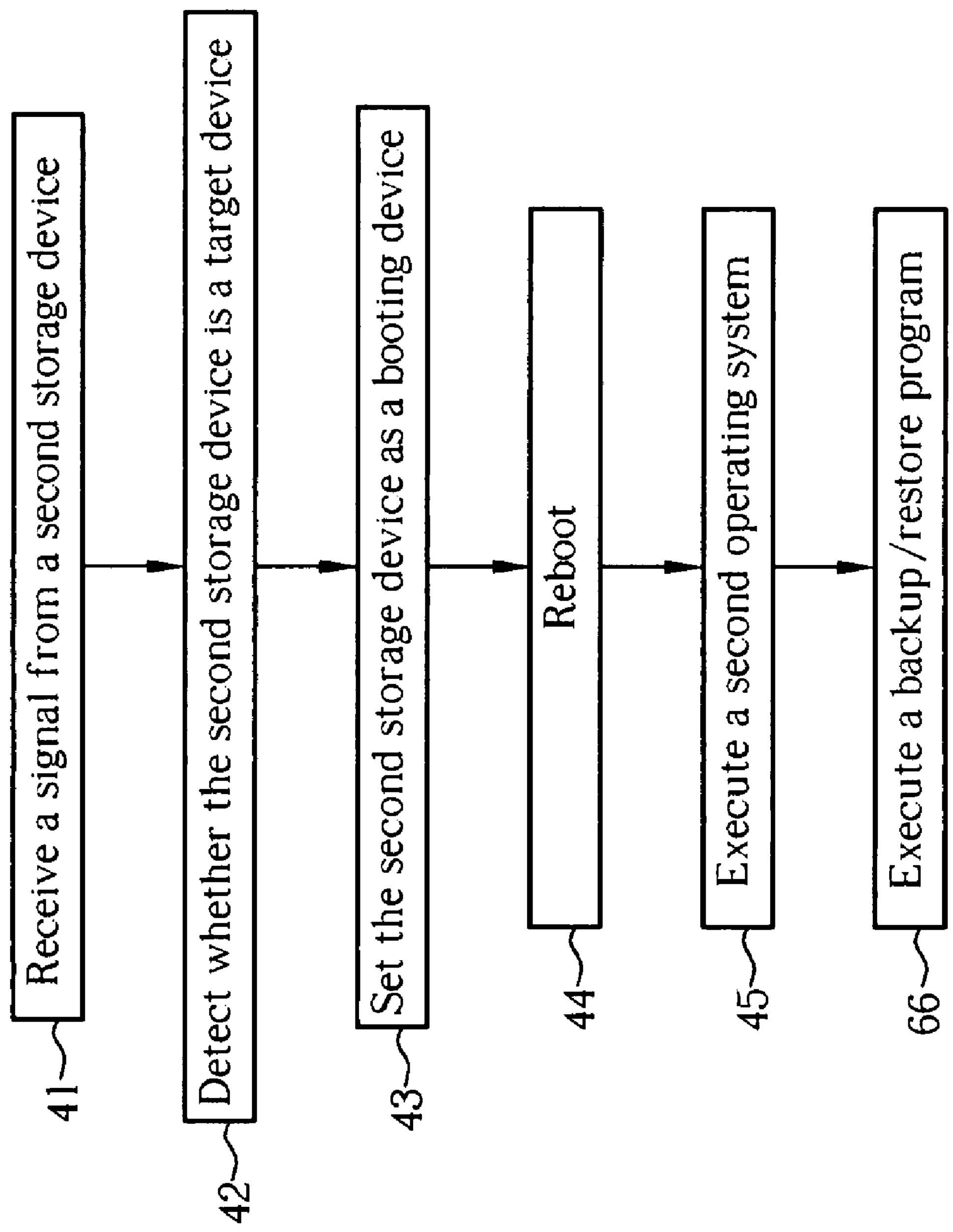
FIG. 6 is a flow chart of the embodiment in FIG. 5.

Please refer to FIG. 6, which is a flow chart of another embodiment based on FIG. 5. Steps 41 to 44 are all similar to the embodiment shown in FIG. 4, and thus omitted here. In this embodiment, another step 66 "executing a backup/restore program" is disclosed. Here, the backup/restore program can be a package software, i.e. in actual applications, the backup/restore operations can be divided into separate backup operations and restore operations. Therefore, step 66 can be divided into two separate steps: "executing backup operation" and "executing restore operation".

In the backup operation, the present invention can assume that the target device is a disk for storing the backup data. Therefore, the steps of the present invention comprise: receiving a triggering signal from the storage device; detecting whether the storage device is a target device; if the storage device is a target device, setting the storage device as a booting device; rebooting; executing the second operating system from the target device; and executing the backup program. After performing these steps, the data of the computer system can be backuped into the target device. Similarly, the last step can be changed to be "executing the restore program", where the target device can be a restore disk for performing the step of restoring the computer system. In this embodiment, the first operating system is the "Windows" system, the second operating system is the "DOS", and the data backup/restore program is the "Ghost". According to the above-mentioned steps, the users are not required to know how to set the BIOS to change the booting order stored inside the BIOS. Furthermore, the users are not required to know how to use DOS or "Ghost". In other words, even if the users are not familiar with the operating systems or the backup/restore programs, they can easily complete the backup/restore operation by just connecting the target device to the computer system.

Figure 7:
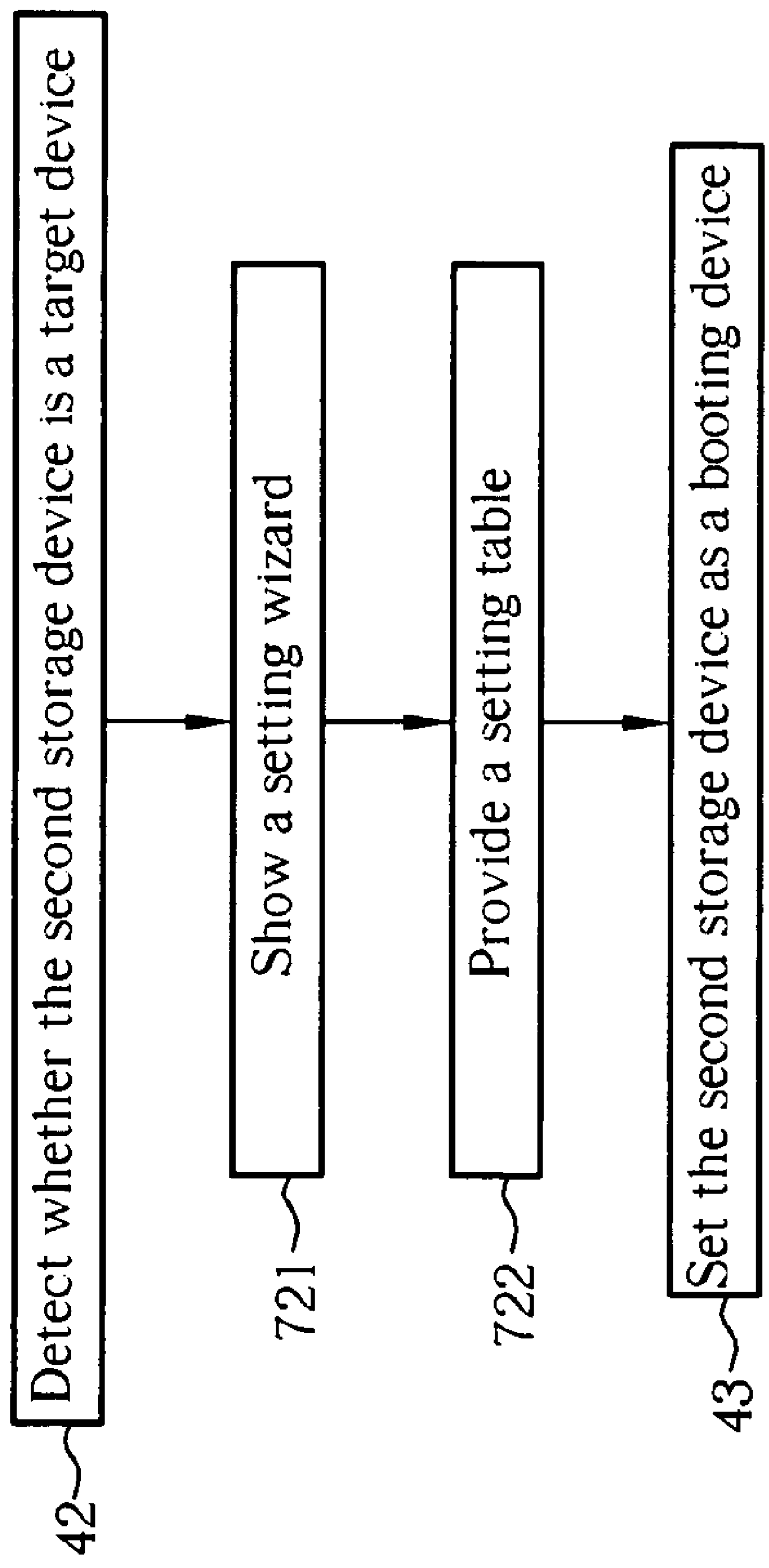
FIG. 7 is a flow chart detailing additional steps added to the flow chart in FIG. 6.

Please refer to FIG. 7. In order to make the target device capable of being utilized to backup/restore data, two steps can be added between steps 42 and 43. First, a setting wizard can be utilized (step 721) in the first operating system 30, and then a setting table is provided (step 722). Please note that the setting table comprises options for selecting whether the backup operation or the restore operation will be executed.

Figure 8:
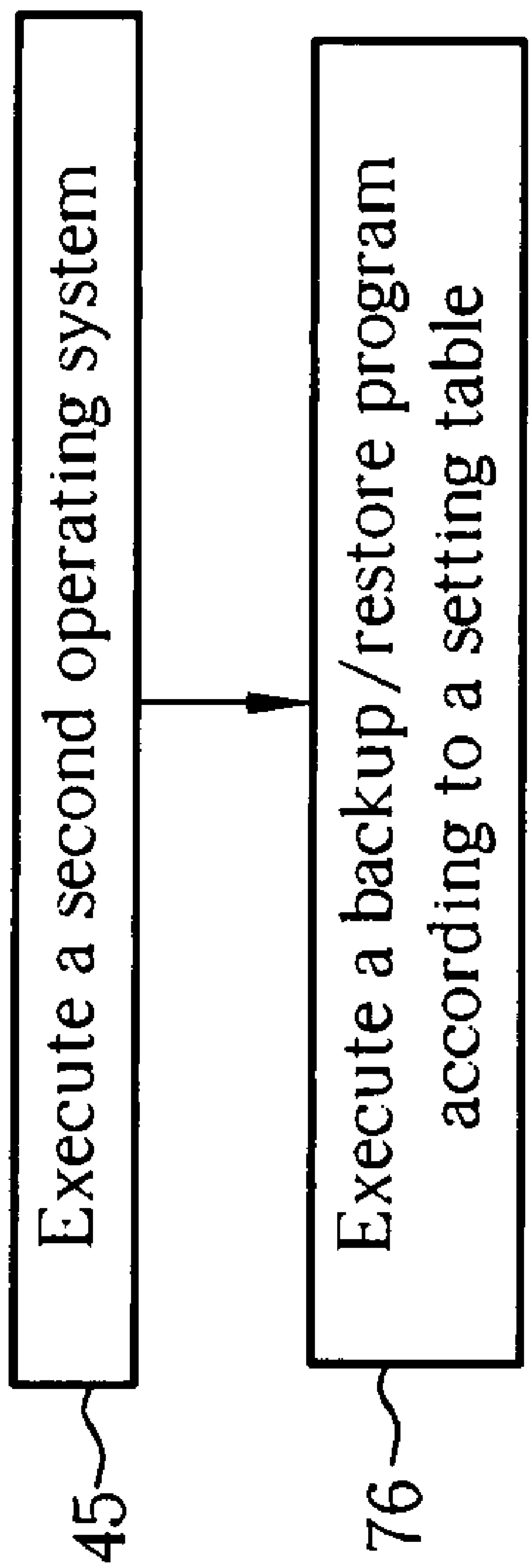
FIG. 8 is a flow chart corresponding to certain steps shown in FIG. 6.

Please refer to FIG. 8, which details the second operating system being executed (step 45). A backup/restore program is executed according to the option determined from the setting table. For example, the user can select the restore operation from the setting table, and the restore operation will therefore be executed later.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for changing a booting source when a first operating system is being executed, the method utilized in a computer system having a first storage device storing the first operating system and a second storage device storing a second operating system, the method comprising:

receiving a signal from the second storage device;

detecting whether the second storage device is a target device;

when it is determined that the second storage device is a target device, setting the second storage device as a booting device;

rebooting; and executing the second operating system from the second storage device.

2. The method of claim 1, wherein the step of detecting whether the second storage device is a target device further comprises:

obtaining port information of the second storage device.

3. The method of claim 1, wherein the step of setting the second storage device as a booting device is performed through a driver or an advanced configuration and power interface (ACPI).

4. The method of claim 1, wherein the second storage device is a portable storage device.

5. A method for backing up/restoring data when a first operating system is being executed, the method utilized in a computer system having a first storage device storing the first operating system and a second storage device storing a second operating system, the method comprising:

receiving a signal from the second storage device;

detecting whether the second storage device is a target device;

when it is determined that the second storage device is a target device, setting the second storage device as a booting device;

rebooting;

executing the second operating system from the second storage device; and executing a data backup/restore program.

6. The method of claim 5, wherein the step of detecting whether the second storage device is a target device comprises:

obtaining port information of the second storage device.

7. The method of claim 5, wherein the step of setting the second storage device as a booting device is performed through a driver or an advanced configuration and power interface (ACPI).

8. The method of claim 5, wherein the second storage device is a portable storage device.

* * * * *